United States Patent
Mathur

(10) Patent No.: US 12,086,282 B1
(45) Date of Patent: Sep. 10, 2024

(54) GRAPH-BASED DATA PRIVACY COMPLIANCE SOLUTION

(71) Applicant: Neo4j Sweden AB, San Mateo, CA (US)

(72) Inventor: Navneet Mathur, Mountain View, CA (US)

(73) Assignee: Neo4j Sweden AB, San Mateo, CA (US)

( * ) Notice: Subject to any disclaimer, the term of this patent is extended or adjusted under 35 U.S.C. 154(b) by 109 days.

(21) Appl. No.: 17/142,871

(22) Filed: Jan. 6, 2021

Related U.S. Application Data

(60) Provisional application No. 62/959,577, filed on Jan. 10, 2020.

(51) Int. Cl.
  G06F 21/62 (2013.01)
  G06F 16/20 (2019.01)
  G06F 16/21 (2019.01)
  G06F 16/901 (2019.01)

(52) U.S. Cl.
  CPC .......... G06F 21/6245 (2013.01); G06F 16/20 (2019.01); G06F 16/211 (2019.01); G06F 16/9024 (2019.01)

(58) Field of Classification Search
  CPC .... G06F 16/20; G06F 16/211; G06F 16/9024; G06F 21/6245
  See application file for complete search history.

(56) References Cited

U.S. PATENT DOCUMENTS

| | | | | |
|---|---|---|---|---|
| 8,443,005 B1* | 5/2013 | Goldman | ............ | G06F 16/9024 707/798 |
| 9,172,621 B1* | 10/2015 | Dippenaar | .......... | H04L 41/0879 |
| 9,602,513 B2* | 3/2017 | Gamage | .................. | H04L 63/10 |
| 9,665,393 B1* | 5/2017 | Johnson | ................ | G06F 21/604 |
| 10,671,752 B1* | 6/2020 | Misra | .................. | G06F 21/6227 |
| 11,240,278 B1* | 2/2022 | Wang | .................... | H04L 51/046 |
| 11,409,820 B1* | 8/2022 | Gutierrez | ............ | G06F 16/9538 |
| 11,514,188 B1* | 11/2022 | Jassal | ................ | G06F 16/90344 |
| 2012/0095998 A1* | 4/2012 | Sheehan | ........... | G06F 16/24575 707/E17.046 |
| 2012/0209886 A1* | 8/2012 | Henderson | .......... | G06F 16/9024 707/E17.011 |
| 2015/0186653 A1* | 7/2015 | Gkoulalas-Divanis | ...................... | G06F 21/60 726/26 |
| 2015/0365454 A1* | 12/2015 | Chao | ....................... | H04L 65/60 709/219 |
| 2018/0046387 A1* | 2/2018 | Erdmann | ............... | G06F 3/0613 |
| 2019/0050445 A1* | 2/2019 | Griffith | ................ | G06K 9/6284 |
| 2019/0087892 A1* | 3/2019 | Pinski | ..................... | H04L 9/0637 |
| 2019/0354690 A1* | 11/2019 | Brigandi | .............. | H04W 12/126 |
| 2020/0242268 A1* | 7/2020 | Epasto | ................... | G06F 16/212 |
| 2020/0389309 A1* | 12/2020 | Ricotta | .................. | H04L 9/3239 |
| 2021/0203673 A1* | 7/2021 | dos Santos | ......... | H04L 63/1416 |
| 2021/0377310 A1* | 12/2021 | Fernando | .............. | H04L 63/101 |
| 2022/0058282 A1* | 2/2022 | Ricotta, Jr. | ............... | H04L 9/50 |
| 2022/0198044 A1* | 6/2022 | Madhavan | ............ | G06F 16/217 |

* cited by examiner

*Primary Examiner* — Allen S Lin
(74) *Attorney, Agent, or Firm* — Van Pelt, Yi & James LLP

(57) ABSTRACT

A graph-based data privacy compliance solution is disclosed. In various embodiments, a privacy graph database based at least in part on an associated privacy graph model is used to store private information of a person, including by including in the privacy graph database a node representing a critical data element comprising the private information of the person.

20 Claims, 6 Drawing Sheets

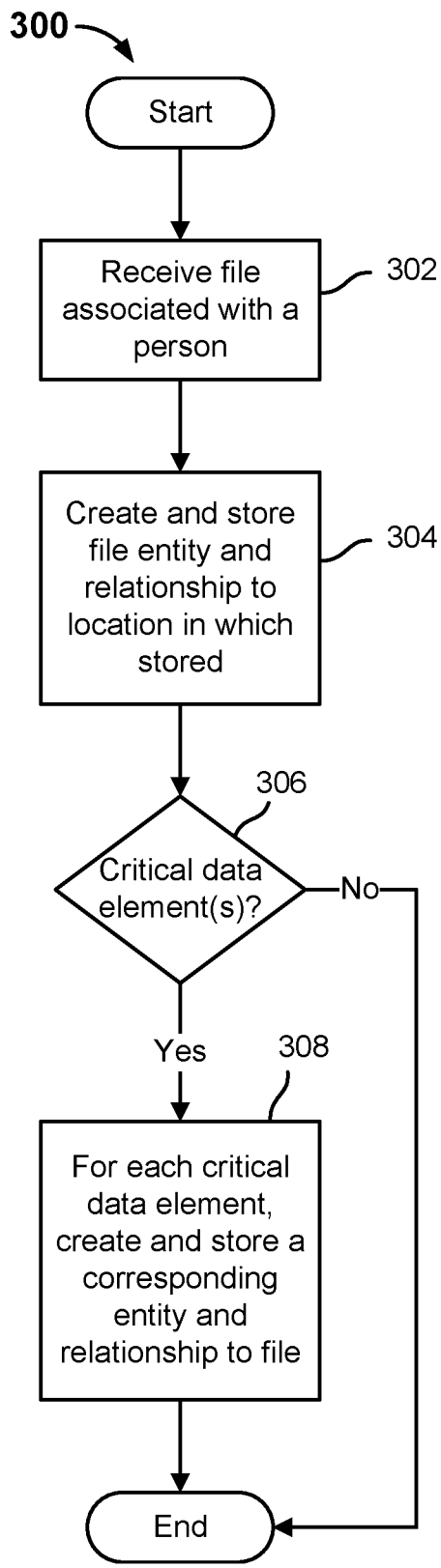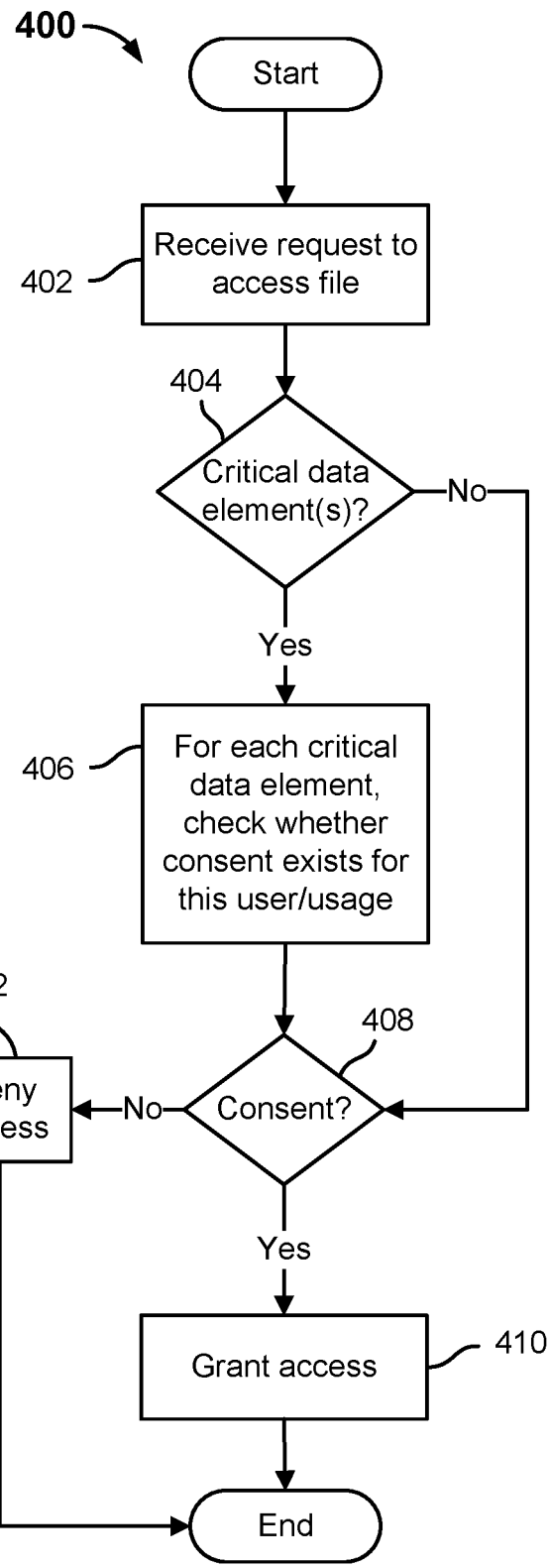
FIG. 3
FIG. 4

GRAPH-BASED DATA PRIVACY COMPLIANCE SOLUTION

CROSS REFERENCE TO OTHER APPLICATIONS

This application claims priority to U.S. Provisional Patent Application No. 62/959,577 entitled GRAPH-BASED DATA PRIVACY COMPLIANCE SOLUTION filed Jan. 10, 2020 which is incorporated herein by reference for all purposes.

BACKGROUND OF THE INVENTION

Companies and other enterprises store vast amounts of data owned by consumers and other individuals. For business and regulatory reasons, such data users need to know, with ever-evolving granularity and specificity, what data they have stored, whose data it is, where it is stored, what purposes the owner has given consent to use which portions of their data, and which restrictions, limitations, and regulatory requirements may apply to a given contemplated usage of data. Different requirements may apply to different types of data from the same person, either within a given location (and associated regulatory regime) or across different jurisdictions. In addition, those who use and store private data may be required to provide and preserve a detailed record, sometimes referred to as a data "lineage", of how the data was stored and changed over time, along with which users accessed the data from which systems, applications, and/or locations, on which occasions, and for what purpose, for example, and/or other requirements. Finally, an entity that stored private data may be required, e.g., by regulation and/or to fulfill customer expectations, to have a reliable and verifiable way to "forget" the private information it knows about a person, such as by verifiably deleting all or some designated portion of the person's private data, potentially while simultaneously being required to preserve a record of how it held and used the data while it was in the entity's possession. Examples of regulatory requirements include European Union's General Data Protection Regulation (GDPR), the California Consumer Privacy Act (CCPA), and Brazil's General Data Protection Law (known by its Portuguese initials, LGPD).

Traditional databases have been used to track and control access to data subject to privacy requirements. However, changes over time in the information required to be captured and preserved may be difficult to implement in a traditional database, and the time to generate reports of which data is stored where and how, when, from where, by whom, and why it was accessed or used may take impractically long amounts of time and computing resources. Such information may be needed in real-time, e.g., in case of forensic analysis of a cybersecurity breach or for a real-time view of where Privacy Data for a Person is located across the enterprise systems. In cases where the number of events and Privacy Data associated with a Person is large, traditional technologies like relational database may not even return any results due to the complex joins required to query the data.

BRIEF DESCRIPTION OF THE DRAWINGS

Various embodiments of the invention are disclosed in the following detailed description and the accompanying drawings.

FIG. 3 is a flow diagram illustrating an embodiment of a process to receive, stored, and track private data.

FIG. 4 is a flow diagram illustrating an embodiment of a process to control access to private information at a data element level of granularity.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A graph database system configured to track private data and enforce associated privacy restrictions is disclosed. In various embodiments, a graph database system as disclosed herein includes a privacy framework configured to track and manage access to data using a graph database that is based on an associated privacy data model. The model defines node types (labels) and relationship types (labels) between them in a manner that facilitates the tracking of information at any required degree of granularity, including by identifying and managing access to different subsets of private data (e.g., critical data elements versus other data) and tracking of information stored in unstructured data objects, such as files.

Figure 1A:
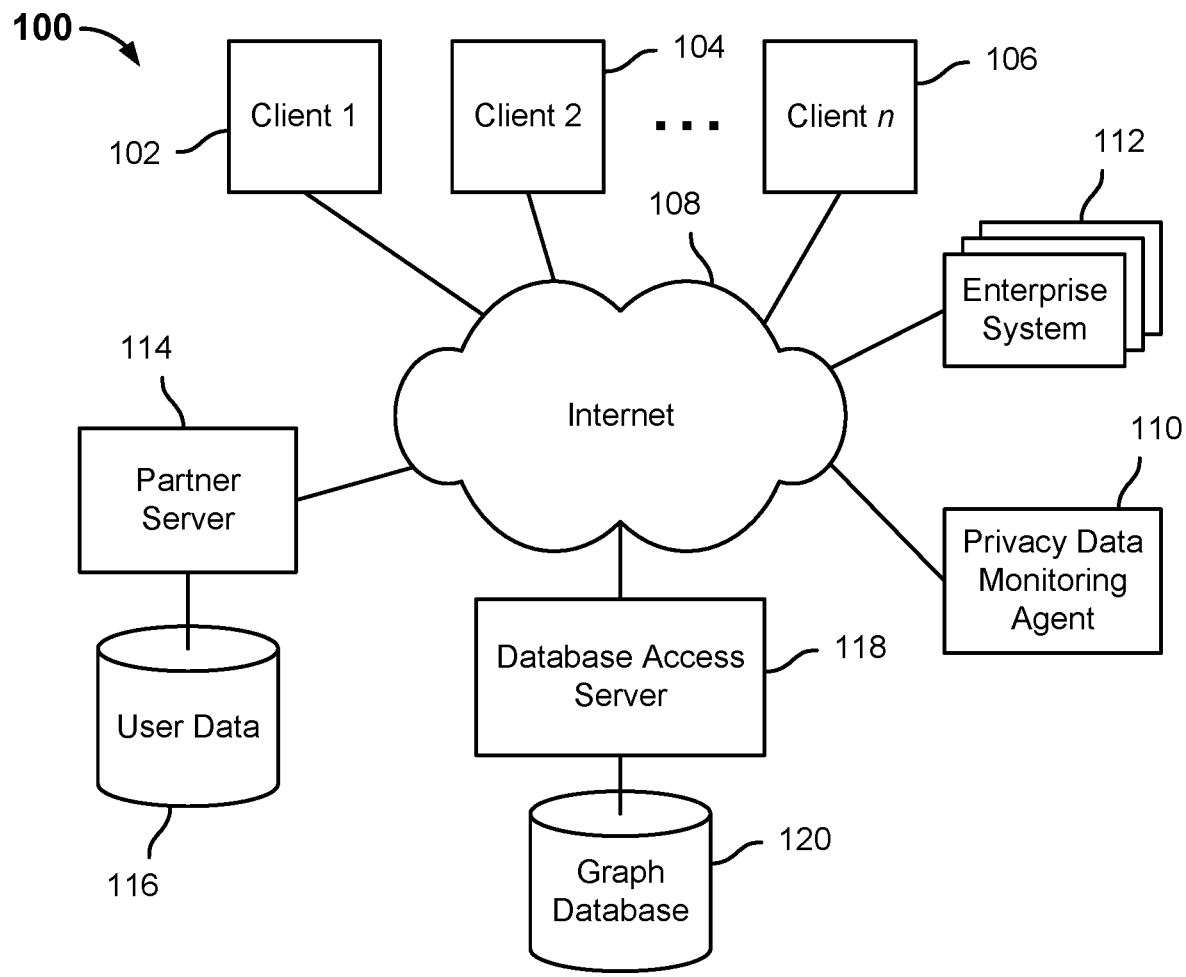
FIG. 1A is a block diagram illustrating an embodiment of a graph database system having a privacy framework as disclosed herein and an associated operating environment.

FIG. 1A is a block diagram illustrating an embodiment of a graph database system having a privacy framework as disclosed herein and an associated operating environment. In the example shown, system and environment 100 includes a plurality of client systems and/or devices, represented in FIG. 1A by clients 102, 104, and 106. The clients 102, 104, 106 are connected to the Internet 108 and access applications and/or services by connecting via the Internet 108 to one or more enterprise systems 112, e.g., application servers, file servers, etc., each of which may store privacy data one or both of structured (e.g., database) or unstructured (e.g., file) forms. Privacy data stored by enterprise systems 112 may include personal identifying information and/or other private information of the users. In addition, enterprise systems 112 may import data from and/or export data to one or more partners of the application or service provider, represented in FIG. 1A by partner server 114 and partner user data store 116.

In the example shown, a privacy data monitoring agent 110 tracks events relating to privacy data (e.g., privacy data stored, updated, accessed, used, imported, exported, deleted, etc., consent given, withdrawn, requested, etc.) Private data may be subject to various regulatory, business, and/or other requirements to track, manage access to, and maintain the ability to verifiably remove the data, e.g., at the request of a consumer or other end user of the application or service. The requirements may vary by locale, including in various cases and combinations one or more of the locations from which the consumer provided the data, the location at which the data is received and/or stored by the provider, etc. In addition, access and use of private information, sometimes referred to herein as "privacy data", may be regulated and may be required to be limited to access and uses for which the consumer has given (and not revoked) specific consent.

In various embodiments, privacy data monitoring agent 110 reports events and/or metadate associated with such events to a privacy framework or module comprising database access server 118. Database access server 118 and associated graph database 120 comprise a graph database system which tracks and manages privacy data to facilitate and enforce compliance with such requirements. In various embodiments, database access server 118 and associated graph database 120 are configured to store privacy data in a graph database to track and manage access to and storage (or deletion) of privacy data.

In various embodiments, as privacy data is received, accessed, updated, and/or otherwise used by users, applications, processes, etc. of the enterprise systems 112, data reflecting such receipt and use of the privacy data is generated, obtained, or otherwise received by the privacy framework monitoring agent 110, e.g., from a monitoring or reporting agent, module or process running on the enterprise system 112. The privacy framework monitoring agent 110 sends metadata associated with the event via the Internet 108 to database access server 118. The database access server 118 stores associated information in a corresponding instance of a privacy data graph in graph database 120. For example, nodes may be added or updated to identify the consumer (person) who owns the data; represent the data that has been received or used, including critical data elements included in the data; identify the location at which the data is stored and/or from which it was accessed and by which user; etc., along with relationships associating the data elements, storage locations, access events, accessing users (e.g., employees of the application and/or service provider), etc., with the person who owns the privacy data.

Figure 1B:
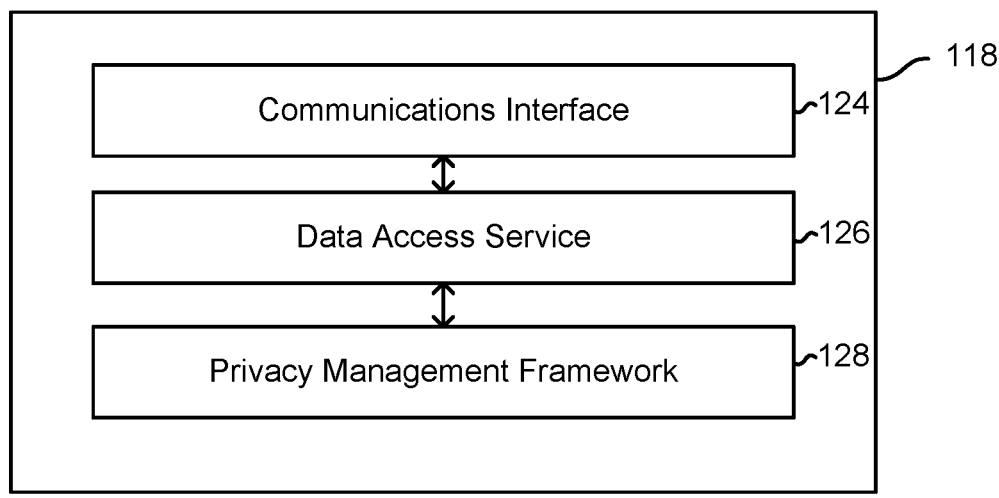
FIG. 1B is a block diagram illustrating an embodiment of a graph database system having a privacy framework as disclosed herein.

FIG. 1B is a block diagram illustrating an embodiment of a graph database system having a privacy framework as disclosed herein. In various embodiments, the database access server 118 of FIG. 1A may be implemented, at least in part, as shown in FIG. 1B. In the example shown, database access server 118 includes a communication interface 124, e.g., a network interface card, configured to enable the database access server 118 to communicate with other systems and devices, e.g., via the Internet 108 in the example shown in FIG. 1A. The database access server 118 further includes a data access service 126 that enables users of the database access server 118 to store, update, and access data stored in one or more graphs in graph database 120. Finally, in this example, database access server 118 includes a privacy management framework 128 configured to store and maintain data in one or more graphs in graph database 120, for example, each based on a corresponding privacy data graph model, as described more fully below.

In various embodiments, privacy graphs stored in graph database 120 may be updated via calls made to one or both of data access service 126 and privacy management framework 128. For example, a user may store a file containing one or more critical data elements of privacy information of a person on an enterprise system 112. Privacy data monitoring agent 110 may capture and/or extract from the file data and/or metadata to be used to update an associated privacy data graph and may communicate such data and/or metadata to the database access server 118 via one or more of communications interface 124, data access service 126, and privacy management framework 128. In response, privacy management framework 128 in various embodiments updates the associated privacy data graph to reflect the data and/or metadata. For example, the privacy management framework 128 may update the privacy data graph to reflect the person who owns the data, which critical data elements are included in the file, where the file is stored, which consents have been given to access and use the data and during which period, etc.

In another example, a user of the enterprise system 112, such as an employee of the enterprise, may attempt to access the above-mentioned file. In various embodiments, privacy information monitoring agent 110 may be invoked to call database access server 118 with a request to determine whether the requested access should be allowed. The privacy management framework 128 may query the associated privacy data graph to determine if the required consent has been given to allow the requested access. For example, if the privacy data graph reflects that the file includes a critical data element for which an associated consent required to allow the user to access the file has not be granted (or was revoked or expired without being renewed), the database access server 118 may return a response indicating the requested access should not be granted.

Figure 2A:
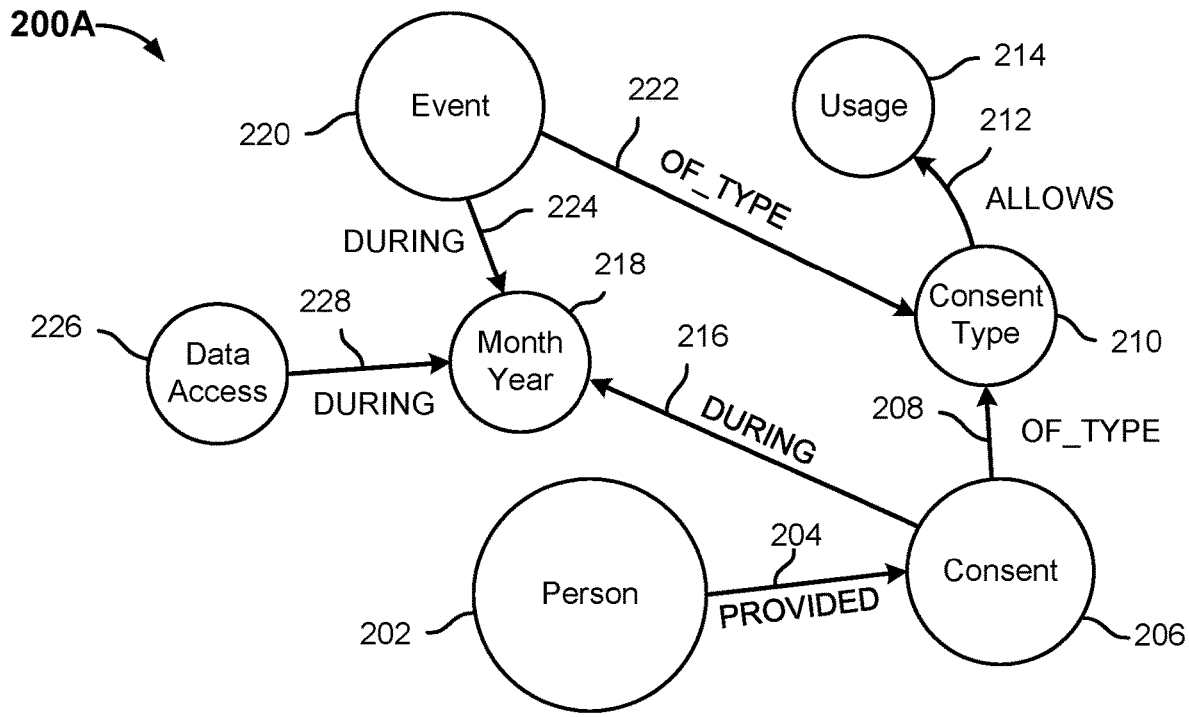
FIG. 2A is a diagram illustrating an example of a portion of a privacy information data model in an embodiment of a graph database system.

FIG. 2A is a diagram illustrating an example of a portion of a privacy information data model in an embodiment of a graph database system. In various embodiments, a privacy information data model may include any number of node types (labels) and/or relationship types (labels) as desired or needed to track and manage storage of, access to, and removal of privacy data of consumers or other persons. In the example shown, partial model 200A includes a Person node 202. Each instance of Person node 202 may have one or more PROVIDED relationships 204 each to a corresponding Consent node 206. In various embodiments, one or more of the respective definitions for Person node 202, PROVIDED relationship 204, and Consent node 206, and/or of other nodes and relationships shown in FIG. 2A, may include a definition of one or more attributes of that node or relationship. For example, a Person node 202 may include a "name" attribute.

Referring further to FIG. 2A, in the example shown each instance of a Consent node 206 may have an OF_TYPE relationship 208 to a Consent Type node 210. In turn, an instance of a Consent Type node 210 may have one or more ALLOWS relationships 212 each to a corresponding instance of a Usage node 214. A Consent node 206 in this example may have a DURING relationship 216 to one or more month and year nodes (e.g., November 2020) 218 during which the Consent was in place (e.g., granted and not revoked). While nodes and relationships are identified in this example by the labels shown in FIG. 2A, in various embodiments the node and relationship labels may be different, e.g., as defined by an administrative user via a user interface.

In various embodiments, data stored in the above-described portions of a privacy management graph database instance based at least in part on partial model 200A may be used to store data reflecting which Consents have been given by a given Person during a given month-year (or other period) and which Usages those Consents allowed, for example.

Referring further to FIG. 2A, the partial graph model 200A in addition defines an Event node 220. Examples of events that may be represented by instances of Event node 220 include, without limitation, a Person providing or updating their privacy data, a Person adding or removing a Consent, data being updated by an internal process, data being imported from a partner or other external source, and data being exported to a partner or other external source. An instance of an Event node 220 may have an OF_TYPE relationship 222 to a Consent Type 210 required for or otherwise implicated by the Event and a DURING relationship 224 to a Month-Year node 218 during which the Event occurred. Finally, partial privacy graph model 200A includes a Data Access node 226 to represent and reflect metadata associated with each instance or occurrence of access to privacy data. An instance of a Data Access node 226 may have a DURING relationship 228 to a Month-Year node 218 during which the access occurred.

In various embodiments, duration and other time information may be captured and used to provide a data "lineage" reflecting when a data element was accessed, which can help determine, e.g., which records were or may have been compromised in the case of a data breach at a given time (or over a given period). Likewise, the data access by a given user during a period may be tracked, which can be used to determine which data may have been compromised as a result of a given user's account having been hacked.

Figure 2B:
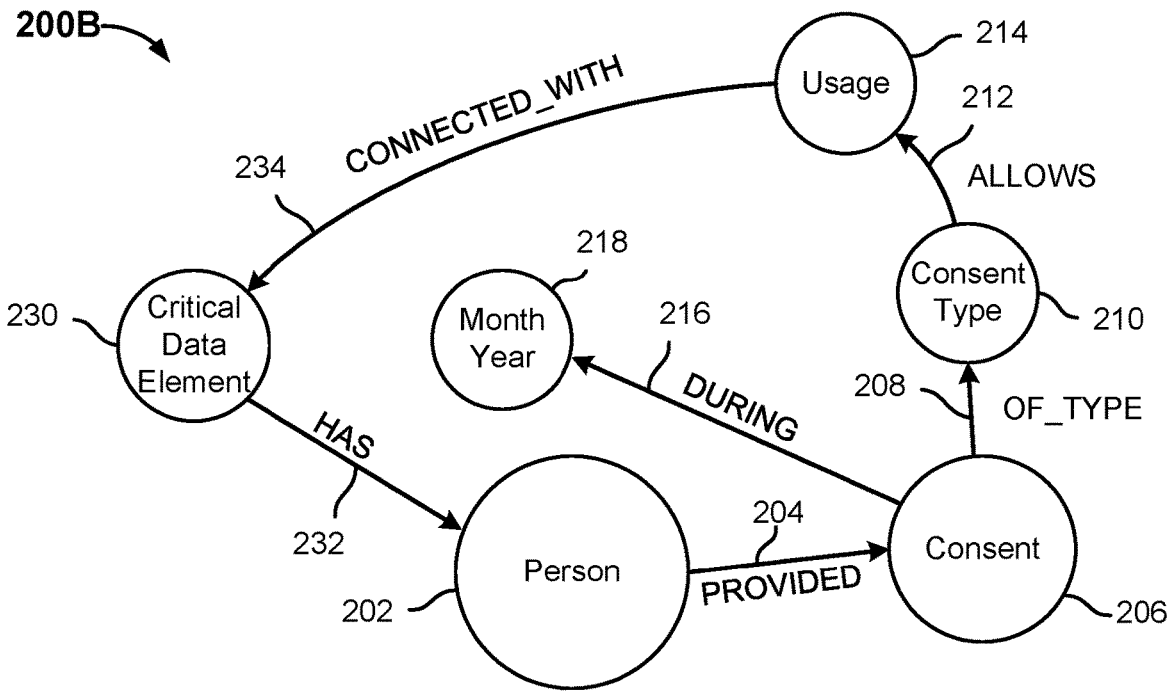
FIG. 2B is a diagram illustrating an example of a portion of a privacy information data model in an embodiment of a graph database system.

FIG. 2B is a diagram illustrating an example of a portion of a privacy information data model in an embodiment of a graph database system. In the example shown, partial model 200B shows that in addition to the model components shown in FIG. 2A a privacy graph model may define a Critical Data Element node type/label 230 to represent and stored metadata associated with a critical data element, such as a Social Security number, passport number, or other government-issued identification number of a Person. Other examples of a critical data element, for privacy compliance and management purposes, include without limitation a home address or other location information; a birth date; a driver's license number; names, ages, and birthdates of minor children; bank account or other financial account information; fingerprint, facial recognition, DNA, or other biometric information; etc.

As shown in FIG. 2B, an instance of Critical Data Element node 230 may have a HAS relationship 232 to a Person node 202 representing an owner of the critical data element represented by the instance of Critical Data Element node 230. A Critical Data Element node 230 may have a CONNECTED_WITH relationship 234 to a Usage node 214, e.g., reflecting a Usage to which the critical data element represented by the instance of Critical Data Element node 230 may (or may not) be put, e.g., under applicable government regulations.

Figure 2C:
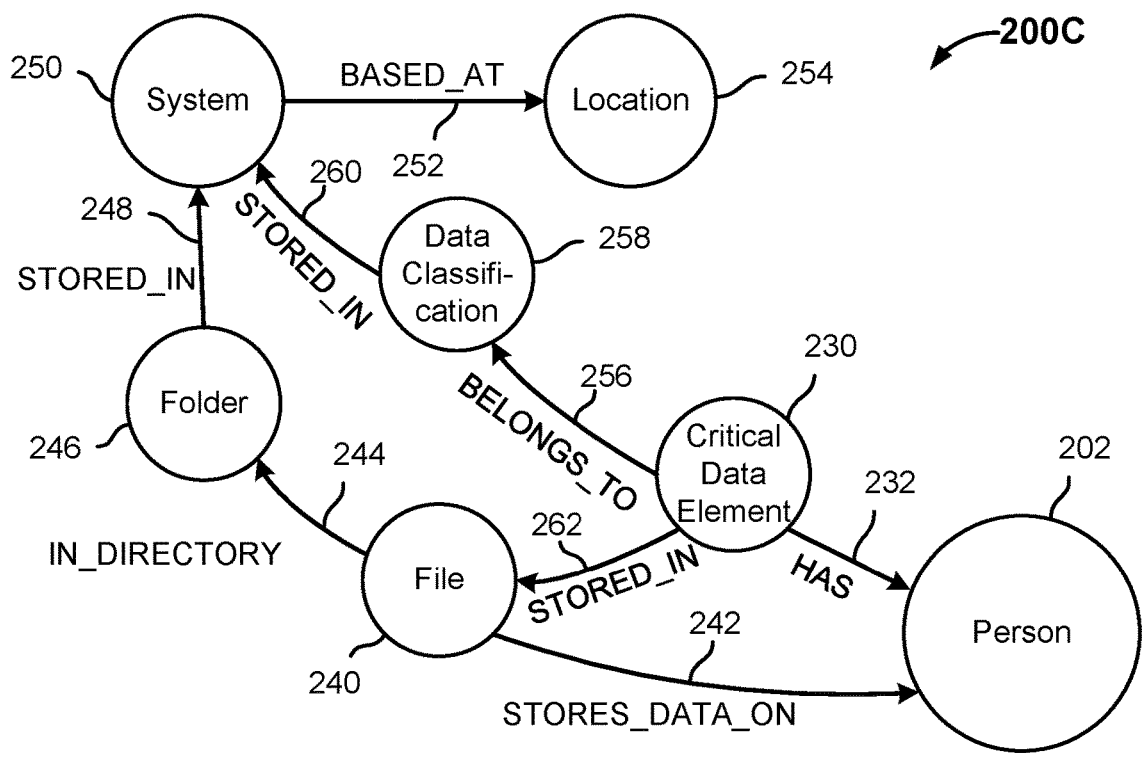
FIG. 2C is a diagram illustrating an example of a portion of a privacy information data model in an embodiment of a graph database system.

FIG. 2C is a diagram illustrating an example of a portion of a privacy information data model in an embodiment of a graph database system. In the example shown, partial model 200C shows that in addition to the model components shown in FIGS. 2A and 2B a privacy graph model may include for an instance of Critical Data Element node 230 a STORED_IN relationship 262 to an instance of a File node 240 that represents a file that contains the element of critical data represented by the instance of Critical Data Element node 230. The File node 240 may have a STORES_DATA_ON relationship 242 to a Person node 202 representing an owner of the data. The File node 240 may further have an IN DIRECTORY relationship 244 to a Folder node 246 representing a folder (or other logical location) in which the file is located. The Folder node 246 may have a STORED_IN relationship 248 to a System node 250 representing a physical system on which the file and folder are stored. The System node 250 may have a BASED_AT relationship 252 to a Location node 254 that represents a geographic location in which the physical system represented by an instance of System node 250 is located.

In the example shown in FIG. 2C, an instance of a Critical Data Element node 230 may have a BELONGS_TO relationship 256 to an instance of a Data Classification node 258. In turn, an instance of Data Classification node 258 may have a STORED_IN relationship 260 to an instance of System node 250 which represents a physical system on which data associated with the Data Classification node 258 instance is (or is authorized to be) stored.

In various embodiments, elements of the partial model shown in FIG. 2C may enable the files or other objects containing critical data elements of a specific person or group of persons to be identified and the locations in which such files are stored located. Such information may be used to ensure and/or demonstrate compliance with local or regional privacy regulations; to manage access and/or usage of critical data elements, which may vary or depend on where the data is stored; and/or to verifiably delete critical data elements, e.g., if required to do so by regulation, policy, or a request from the data owner.

Figure 2D:
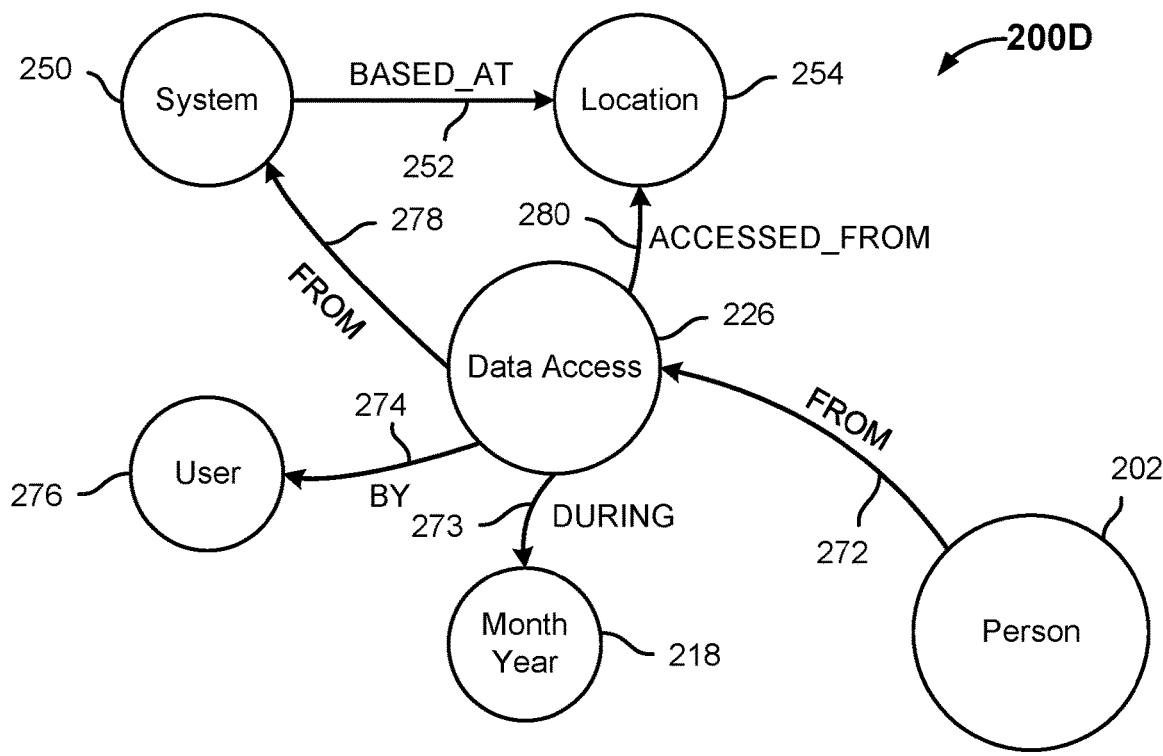
FIG. 2D is a diagram illustrating an example of a portion of a privacy information data model in an embodiment of a graph database system.

FIG. 2D is a diagram illustrating an example of a portion of a privacy information data model in an embodiment of a graph database system. In the example shown, partial model 200D shows that in addition to the model components shown in FIGS. 2A, 2B, and 2C, a privacy graph model may include for an instance of a Data Access node 232 (see FIG. 2A) a FROM relationship 272 to a Person node 202 representing a person from whom the data was obtained, e.g., via a web or other application user interface. In addition, an instance of Data Access node 232 may have one or more of a DURING relationship to an instance of Month Year node 218 representing a month and year during which the access occurred; a BY relationship 274 to an instance of a User node 276 representing a user who accessed the data; a FROM relationship 278 to an instance of System node 250 representing a physical system from which the data was accessed, and an ACCESSED_FROM relationship 280 to an instance of Location node 254 representing a location from which the user accessed the data, such as a geographic location at which the user was located at the time the user accessed the data.

In various embodiments, elements of the partial model shown in FIG. 2D may enable the details of each occurrence of data access to be stored and for queries about a given data access event, or which data has been accessed when from a given system or by a given user or during a certain period, to be answered.

Figure 2E:
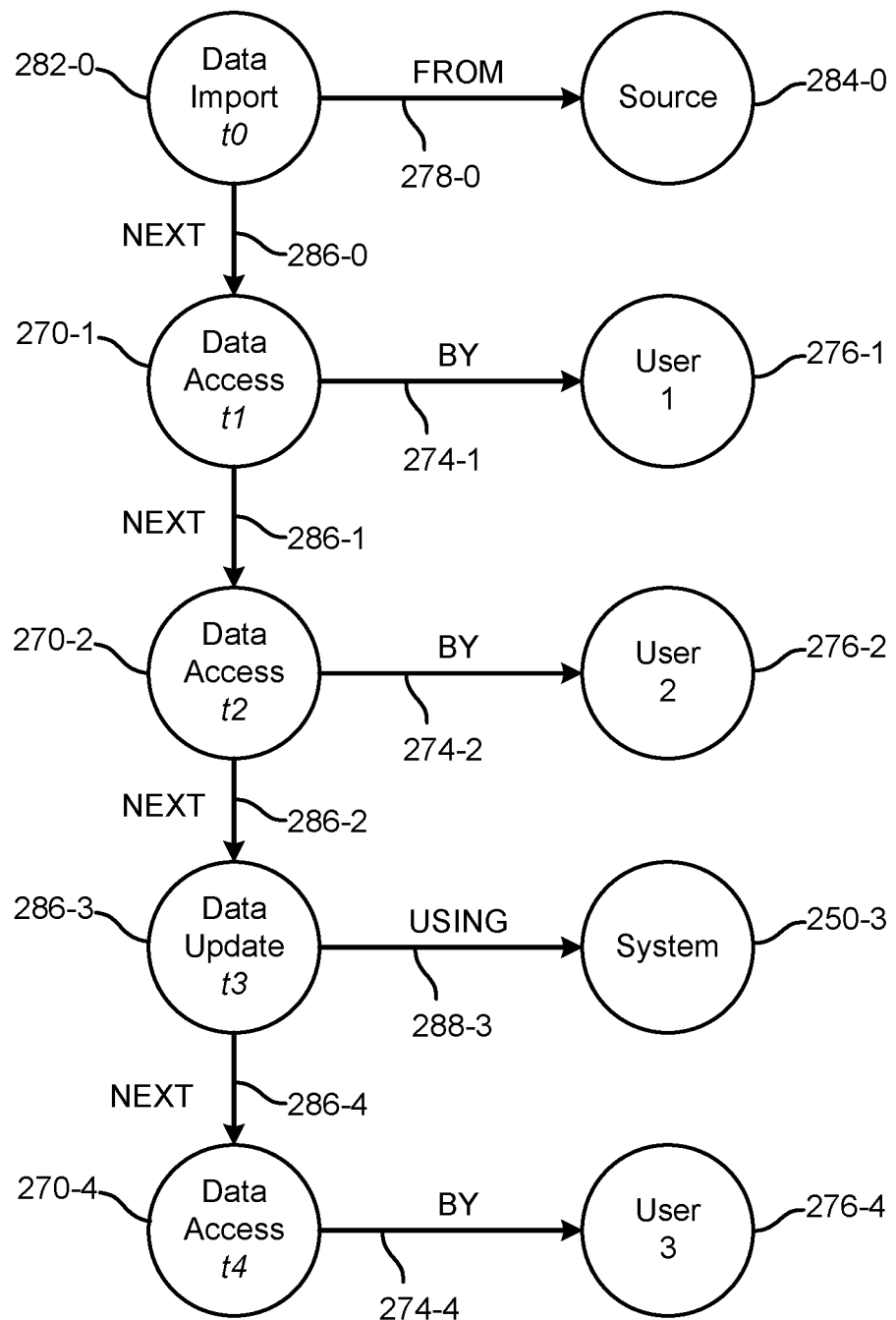
FIG. 2E is a diagram illustrating an example of a portion of a portion of a privacy data graph stored by an embodiment of a graph database system.

FIG. 2E is a diagram illustrating an example of a portion of a portion of a privacy data graph stored by an embodiment of a graph database system. In various embodiments, a partial privacy data graph, such as the example shown in FIG. 2E, may be stored by a database access server, such as database access server 118, based on a model that includes elements shown in FIG. 2A through 2D. In some embodiments, the graph database server may be configured to generate, provide, and/or display a visual representation of the graph portion as shown in FIG. 2E, or portions thereof, such as to show the data "lineage" of a given element or set of data.

In the example shown, Data Import node instance 282-0 reflects a data import at time t0 from (FROM relationship 278-0) a source (e.g., physical system, partner entity, etc.) represented by Source node instance 284-0. A NEXT relationship instance 286-0 represents a sequential (in time) relationship of the data import event represented by Data Import node instance 282-0 at time t0 to a data access event at time t1 represented in FIG. 2E by Data Access node instance 270-1. (The appended "-1" indicating an instance associated with time "t1", etc.) The Data Access node instance 270-1 has a BY relationship instance 274-1 to a User node instance 276-1 which represents a user that accessed the data at time t1, in this example. The Data Access node instance 270-1 in turn has a NEXT relationship instance 286-1 to a Data Access node instance 270-2, which in this example represents an occurrence of data access at time t2 by (BY relationship instance 274-2) a user represented by User node instance 276-2.

In this example, Data Access node instance 270-2 has a NEXT relationship instance 286-2 to a Data Update node instance 286-3 representing an instance of data being updated (e.g., by the owner, a user, an internal or external process or system) at time t3 using (USING relationship instance 288-3) a system represented by System node instance 250-3. Data Update node instance 286-3 further has a NEXT relationship instance 286-4 to a Data Access node instance 270-4, representing a data access event at time t4 by (BY relationship instance 274-4) a user represented by User node instance 276-4.

As the example shown in FIG. 2E illustrates, in various embodiments techniques disclosed herein may be used to preserve and/or generate a visualization of a data lineage for a given element of data, such as a specific "critical data element". Receipt, import, export, access, update, deletion, and related events may be tracked, along with consents and associated times during which such consents remained in place. Techniques disclosed herein may be used to track the source or possible source of a data breach or other security incident, to respond to a regulatory demand for information, or to provide information to a user as to how their data was stored and used.

FIG. 3 is a flow diagram illustrating an embodiment of a process to receive, stored, and track private data. In various embodiments, the process 300 of FIG. 3 is implemented by a database access server, such as database access server 118 of FIGS. 1A and 1B. In some embodiments, the process 300 is performed with respect to a graph database that is based at least in part on a corresponding privacy data model, such as one that includes the partial model shown in FIG. 2C. In the example shown, at 302 a file associated with a person, e.g., a file containing privacy data of the person, is received. For example, the person may have provided the file in response to a request or requirement in connection with a request to access an application or service. Or, the person may have provided information, e.g., via a webform, that was used to generate and/or populate a document or other file. At 304, a privacy data graph database is updated to reflect receipt and storage of the file received at 302. In this example, at 304 a File node instance may be created and stored to represent the file, and the File node instance may be linked by respective relationships to one or more other nodes, such as a Person node instance representing a person who owns the data in the file and/or one or both of a Folder node instance representing a logical location in which the file is store and a System node instance representing a physical system on which the file is stored.

At 306, it is determined whether the file contains any critical data element(s). For example, the person who owns the data or a user (or application or process) who received and stored the file may designate the file as including a critical data element. Or, in some embodiments, the file may be parsed or otherwise machine processed (e.g., applying one or more regular expressions to text extracted from the file) to detect the presence of a critical data element within the file. If the file is determined at 306 to contain a critical data element, then at 308 for each critical data element a corresponding Critical Data Element node instance is stored in the privacy data graph database and the Critical Data Element node instance is linked to the File node instance representing the file by a corresponding relationship associated with the nodes in the privacy data graph database. If the file is determined at 306 not to contain any critical data element, the process 300 ends without adding any Critical Data Element node instance to the privacy data graph database.

FIG. 4 is a flow diagram illustrating an embodiment of a process to control access to private information at a data element level of granularity. In various embodiments, the process 400 of FIG. 4 is implemented by a database access server, such as database access server 118 of FIGS. 1A and 1B. In some embodiments, the process 400 is performed using a graph database that is based at least in part on a corresponding privacy data model, such as one that includes one or more of the partial models shown in FIGS. 2A through 2D. In the example shown, at 402 a request to access a file (or other stored object) is received. At 404, a privacy data graph as disclosed herein is consulted to determined whether the file (or other object) contains any critical data element. For example, a File node instance representing the file may be checked to determine whether the node has any STORED_IN relationship (e.g., see FIG. 2C) to a Critical Data Element node instance. If the file is determined at 404 to contain a critical data element, then at 406 the privacy data graph database in queried and traversed further to determine for each critical data element in the file whether a consent required to access the critical data element, for example by the user requesting access and/or for the usage for which access has been requested, has been given and remains in force. At 408, if all required consents are determined to be present (e.g., general or implied consent if no critical data element is in the file or any specific consent that may or may not be required for each and every critical data element, if any, in the file), the access is granted at 410. If any required consent is missing (408), the access is denied at 412. In some embodiments, denial of access at 412 may include displaying a reason the access was denied. The reason may be based at least in part on information from the data privacy graph database, such as to identify a required consent that is missing (e.g., never given or since expired or revoked).

Figure 5:
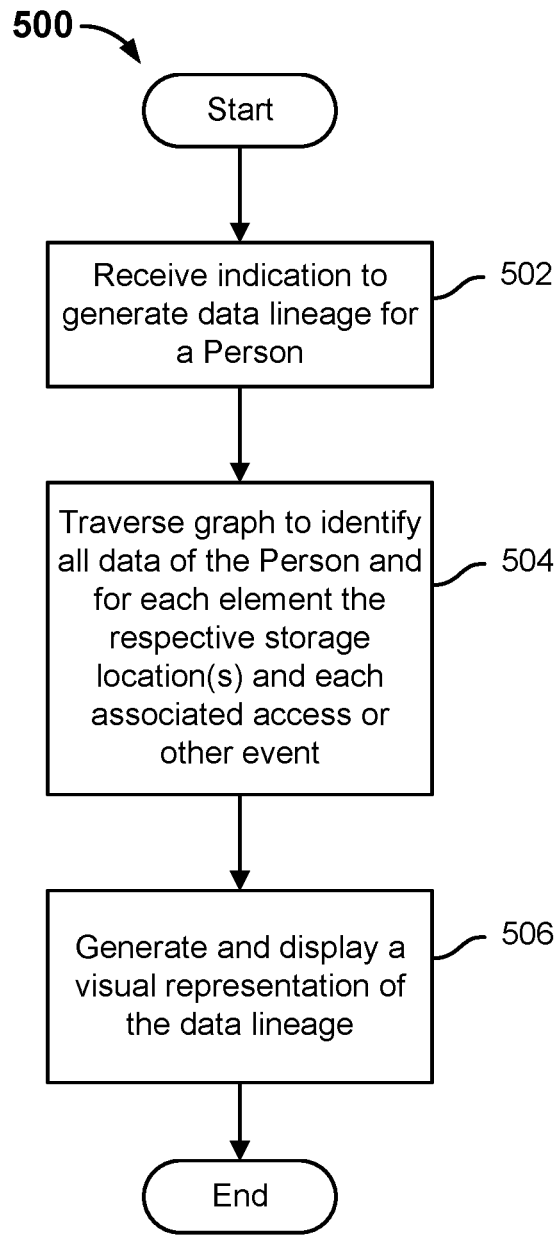
FIG. 5 is a flow diagram illustrating an embodiment of a process to generate and display a data lineage.

FIG. 5 is a flow diagram illustrating an embodiment of a process to generate and display a data lineage. In various embodiments, the process 500 of FIG. 5 is implemented by a database access server, such as database access server 118 of FIGS. 1A and 1B. In some embodiments, the process 500 is performed using a graph database that is based at least in part on a corresponding privacy data model, such as one that includes one or more of the partial models shown in FIGS. 2A through 2D. In some embodiments, the process 500 produces a data lineage visualization, such as the partial data lineage shown in FIG. 2E.

In the example shown in FIG. 5, at 502 an indication is received to generate and display a data lineage for a person represented by a Person node instance in a privacy data graph database. At 504, the privacy data graph database is traversed, starting at the Person node instance, to identify nodes representing elements of the person's data (e.g., files, critical data elements, etc.), and for each such element of data to identify and generate a representation of relevant events. For example, an event that is first in time with respect to a data element may be represented in the privacy data graph database by a Data Access node instance which includes an attribute and/or which has a relationship identifying the node instance as the first tracked event with respect to that data element. Each subsequent event may have a "NEXT" or similar relationship from the node representing the immediately previous tracked event (e.g., data import, access, update, export, deletion, etc.), enabling the sequential (in time) sequence of events to be located quickly by traversing the graph via the NEXT relationships until a last event having no NEXT relationship is reached (e.g., see the example shown in FIG. 2E). The privacy data graph may similarly be traversed for each data element of the person. In various embodiments, timestamps, relationships indicating sequential order, etc., may be used to ensure that data events may be organized and/or presented in a chronological order, enabling the data lineage to be determined, preserved, and presented.

At 506, the information retrieved from the privacy data graph database is used to generate and provide (e.g., display via a browser or application user interface) a visualization of the data lineage for the person and their respective data elements.

Figure 6:
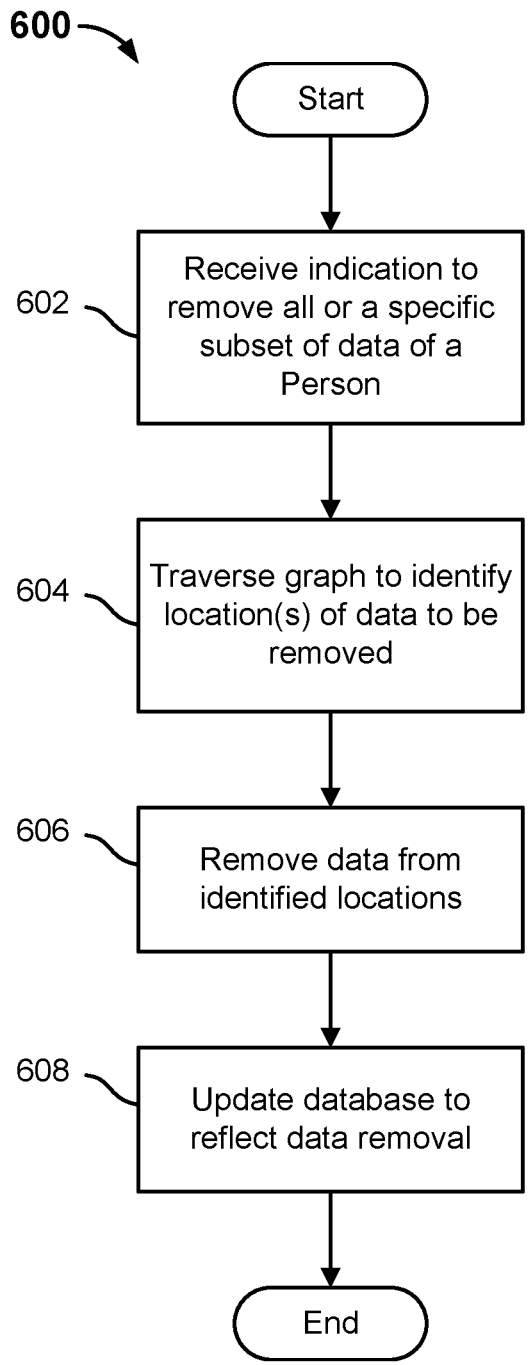
FIG. 6 is a flow diagram illustrating an embodiment of a process to remove private information of a person.

FIG. 6 is a flow diagram illustrating an embodiment of a process to remove private information of a person. In various embodiments, the process 600 of FIG. 6 is implemented by a database access server, such as database access server 118 of FIGS. 1A and 1B. In some embodiments, the process 600 is performed using a graph database that is based at least in part on a corresponding privacy data model, such as one that includes one or more of the partial models shown in FIGS. 2A through 2D. In the example shown, at 602 an indication is received to remove all or a specific subset of a person's data. For example, an indication may be received at 602 to remove a specific critical data element, such as one the person long longer wishes the application and/or service provider to store and/or a data element that by regulation may no longer be stored.

Or, at 602, a consent may be revoked. Critical (or other) data elements associated with the consent are determined by traversing the graph. Any elements covered by a consent that remains in force are removed from the set, leaving a set of elements that should be removed as a result of revocation of the consent.

At 604, a privacy data graph database as disclosed herein is traversed to identify the data (or subset) to be removed and for each element of data the file(s) (or other object(s)) and/or other locations in which such data is stored. See, e.g., the example shown in FIG. 2C. At 606, the information obtained at 604, e.g., which files contain the critical data element(s) to be removed, and where is each file stored, is used to remove the data elements from the identified locations. At 608, the privacy data graph database is updated to reflect removal of the deleted data while preserving information reflecting how the information was accessed, updated, and otherwise used prior to being removed.

In various embodiments, techniques disclosed herein may be used to track and manage access to and use of privacy data, including at a "data element" level of granularity and including when such data elements are stored as included in files or other unstructured data objects.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory or other data storage device that stores a privacy graph database based at least in part on an associated privacy graph model, wherein the privacy graph model includes a graph representing a privacy information data model of the privacy graph data base and the privacy information data model indicates at least one of: storage of, access to, or removal of privacy information of a person; and
a processor coupled to the memory or other data storage device that:
uses the privacy graph database to manage the private information, including by including in the privacy graph database and the associated privacy graph model, for each critical data element included in a stored object that comprises the private information:
a corresponding critical data element node representing that critical data element; and
a relationship representing a relationship of that critical data element to the stored object;
manages access to the stored object based at least in part on attribute data of each critical data element node associated with the stored object;
includes in the privacy graph database, for each such node representing an instance of an event that tracks changes to the private information:
a first node associated with at least one of: another instance of the event or another event;

a first edge connecting the instance of the event and the first node, wherein the first edge indicates a sequential relationship between the instance of the event and the first node;

a second node associated with an entity making the changes to the private information; and a second edge connecting the instance of the event and the second node, wherein the second edge indicates a relationship between the entity making the changes to the private information and the instance of the event; and includes in the privacy graph database a node representing a consent given by the person with respect to usage of the private information of the person.

2. The system of claim 1, wherein the processor is further configured to include in the privacy graph database a relationship representing an ownership relationship between the critical data element and the person.

3. The system of claim 1, wherein the node representing the consent given by the person with respect to the usage of the private information of the person further represents which specific critical data elements associated with the consent.

4. The system of claim 3, wherein the processor is further configured to include in the privacy graph database a first relationship representing a first connection between the node representing the critical data element and the node representing the consent and a second relationship representing a second connection between the node representing the consent and the person.

5. The system of claim 4, wherein the processor is further configured to manage access to data comprising the critical data element based at least in part on data comprising the node representing the consent.

6. The system of claim 3, wherein the processor is further configured to include in the privacy graph database a relationship associating the consent with a specific time period during which the consent was in force.

7. The system of claim 1, wherein the processor is further configured to include in the privacy graph database a relationship associating the node representing the critical data element with a node representing one or more of a storage system in which and a location at which the critical data element is stored.

8. The system of claim 1, wherein the processor is further configured to include in the privacy graph database a relationship associating the node representing the stored object with a folder or other logical storage location in which the stored object is stored.

9. The system of claim 8, wherein the processor is further configured to include in the privacy graph database a relationship associating the folder or other logical storage location with a system or other physical location in which objects associated with the folder or other logical storage location are stored.

10. The system of claim 1, wherein the processor is further configured to use the privacy graph database to manage access to the critical data element.

11. The system of claim 1, wherein the processor is further configured to use the privacy graph database to track access to the critical data element.

12. The system of claim 11, wherein the tracking includes one or more of who accessed the critical data element, where they were located when they accessed the critical data element, from which system the critical data element was accessed, which application was used to access the critical data element, and when the critical data element was accessed.

13. The system of claim 12, wherein the processor is further configured to include in the privacy graph database for each occurrence of access to the critical data element a corresponding node representing the instance of data access.

14. The system of claim 13, wherein the processor is further configured to include in the privacy graph database for each such node representing an instance of data access to the critical data element a relationship representing a sequential order in time between the data access instance and an immediate next instance of data access to the critical data element.

15. The system of claim 1, wherein the instance of the event tracks changes to the private information, the event being one or more of the following types: data import, data export, data movement, and data update.

16. The system of claim 15, wherein each node representing an instance of an event includes a relationship or other value associating with the event a chronological relationship to one or more other event nodes.

17. The system of claim 1, wherein:
an edge connected to the critical data element node represents a relationship with the person; and
the person owns data associated with the critical data element.

18. The system of claim 17, wherein another edge connected to the critical data element node represents a permitted usage of data associated with the critical data element node to which the other edge is connected.

19. A method, comprising:
storing a privacy graph database based at least in part on an associated privacy graph model, wherein the privacy graph model includes a graph representing a privacy information data model of the privacy graph database and the privacy information data model indicates at least one of: storage of, access to, or removal of private information of a person; and using the privacy graph database to manage the private information, including by including in the privacy graph database and the associated privacy graph model, for each critical data element included in a stored object that comprises the private information:
a corresponding critical data element node representing that critical data element; and
a relationship representing a relationship of that critical data element to the stored object;

including in the privacy graph database, for each such node representing an instance of an event that tracks changes to the private information:
a first node associated with at least one of: another instance of the event or another event;
a first edge connecting the instance of the event and the first node, wherein the first edge indicates a sequential relationship between the instance of the event and the first node;
a second node associated with an entity making the changes to the private information; and
a second edge connecting the instance of the event and the second node, wherein the second edge indicates a relationship between the entity making the changes to the private information and the instance of the event; and including in the privacy graph database a node representing a consent given by the person with respect to usage of the private information of the person;

wherein access to the stored object is managed based at least in part on attribute data of each critical data element node associated with the stored object.

20. A computer program product embodied in a non-transitory computer readable medium and comprising computer instructions for:
　storing a privacy graph database based at least in part on an associated privacy graph model, wherein the privacy graph model includes a graph representing a privacy information data model of the privacy graph database and the privacy information data model indicates at least one of: storage of, access to, or removal of private information of a person; and
　using the privacy graph database to manage private information, including by including in the privacy graph database and the associated privacy graph model, for each critical data element included in a stored object that comprises the private information:
　　a corresponding critical data element node representing that critical data element; and
　　a relationship representing a relationship of that critical data element to the stored object;
　including in the privacy graph database, for each such node representing an instance of an event that tracks changes to the private information:
　　a first node associated with at least one of: another instance of the event or another event;
　　a first edge connecting the instance of the event and the first node, wherein the first edge indicates a sequential relationship between the instance of the event and the first node;
　　a second node associated with an entity making the changes to the private information; and
　a second edge connecting the instance of the event and the second node, wherein the second edge indicates a relationship between the entity making the change to the private information and the instance of the event; and
　including in the privacy graph database a node representing a consent given by the person with respect to usage of the private information of the person;
　wherein access to the stored object is managed based at least in part on attribute data of each critical data element node associated with the stored object.

\* \* \* \* \*